(12) United States Patent
Young et al.

(10) Patent No.: US 7,194,803 B2
(45) Date of Patent: Mar. 27, 2007

(54) SEAL RING AND METHOD OF FORMING MICRO-TOPOGRAPHY RING SURFACES WITH A LASER

(75) Inventors: Lionel A. Young, Murrieta, CA (US); Jeffery R. Staloch, Corona Del Mar, CA (US)

(73) Assignee: Flowserve Management Company, Irving, TX (US)

( * ) Notice: Subject to any disclaimer, the term of this patent is extended or adjusted under 35 U.S.C. 154(b) by 254 days.

(21) Appl. No.: 10/334,160

(22) Filed: Dec. 30, 2002

(65) Prior Publication Data

US 2003/0209859 A1 Nov. 13, 2003

Related U.S. Application Data

(63) Continuation of application No. PCT/US01/21536, filed on Jul. 5, 2001.

(51) Int. Cl.
*B21D 53/84* (2006.01)
*B23K 26/00* (2006.01)

(52) U.S. Cl. ............... 29/888.3; 29/557; 219/121.69

(58) Field of Classification Search ............... 277/399, 277/400–401, 403, 408; 29/557, 888.3; 219/121.69
See application file for complete search history.

(56) References Cited

U.S. PATENT DOCUMENTS

| | | | |
|---|---|---|---|
| 3,640,541 A | 2/1972 | Taschenberg | |
| 3,759,133 A | 9/1973 | Budych et al. | |
| 4,407,513 A | 10/1983 | Takenaka et al. | |
| 4,654,115 A | 3/1987 | Egitto et al. | |
| 4,714,257 A | 12/1987 | Heinrich et al. | |
| 4,756,765 A | 7/1988 | Woodroffe | |
| 4,836,561 A | 6/1989 | Lebeck et al. | |
| 4,908,081 A | 3/1990 | Heinrich et al. | |

(Continued)

FOREIGN PATENT DOCUMENTS

DE 29 28 504 A1 1/1981

(Continued)

OTHER PUBLICATIONS

PCT Application No. PCT/US01/21536 Written Opinion, Form PCT/IPEA/408 dated Mar. 4, 2003.

(Continued)

*Primary Examiner*—Vishal Patel
(74) *Attorney, Agent, or Firm*—Flynn, Thiel, Boutell & Tanis, P.C.

(57) ABSTRACT

A seal ring of a shaft seal has micro-topography depth features, such as wavy faces or radial grooves, formed in the seal face which define a hydrodynamic seal region between opposing seal faces. The micro-topography depth features are formed by an excimer laser shaped such that the beam shape at least has non-linear side edges which define convergent side areas of the beam. The convergent side areas are defined by side edge sections which converge toward each other and preferably are non-linear. For example, the beam shape may be circular or elliptical. The laser beam first cuts repeatedly along the same beam path to define a cut with an increasing depth, whereby the laser beam is shifted incrementally sidewardly to define multiple adjacent beam cuts that form the micro-topography feature such as a valley of a wavy face, a radial groove or the like. As the laser beam cuts adjacent parallel grooves, sidewardly adjacent beam passes overlap one with each other and blend the edges of the sidewardly adjacent grooves together. The method of the invention provides micro-topography depth features that are precisely and accurately defined to improve performance of the seal ring.

24 Claims, 9 Drawing Sheets

U.S. PATENT DOCUMENTS

| | | | |
|---|---|---|---|
| 5,066,357 A * | 11/1991 | Smyth et al. ............... 216/18 |
| 5,090,712 A | 2/1992 | Pecht et al. |
| 5,151,135 A | 9/1992 | Magee et al. |
| 5,174,584 A | 12/1992 | Lahrman |
| 5,223,693 A * | 6/1993 | Zumoto et al. ........ 219/121.68 |
| 5,284,477 A | 2/1994 | Hanna et al. |
| 5,296,673 A | 3/1994 | Smith |
| 5,310,986 A | 5/1994 | Zumoto et al. |
| 5,314,522 A * | 5/1994 | Kondo et al. ............... 65/31 |
| 5,328,517 A | 7/1994 | Cates et al. |
| 5,369,281 A | 11/1994 | Spinnler et al. |
| 5,418,349 A | 5/1995 | Swain et al. |
| 5,478,983 A | 12/1995 | Rancourt |
| 5,491,319 A | 2/1996 | Economikos et al. |
| 5,504,301 A | 4/1996 | Eveland |
| 5,529,317 A | 6/1996 | Muller |
| 5,529,318 A | 6/1996 | Fuse et al. |
| 5,562,840 A | 10/1996 | Swain et al. |
| 5,571,335 A | 11/1996 | Lloyd |
| 5,664,787 A | 9/1997 | Fuse et al. |
| 5,681,395 A | 10/1997 | Werner |
| 5,739,502 A * | 4/1998 | Anderson et al. ...... 219/121.71 |
| 5,834,094 A | 11/1998 | Etsion et al. |
| 5,947,481 A | 9/1999 | Young |
| 5,952,080 A | 9/1999 | Etsion et al. |
| 6,002,100 A | 12/1999 | Etsion |
| 6,034,349 A | 3/2000 | Ota |
| 6,046,430 A | 4/2000 | Etsion |

FOREIGN PATENT DOCUMENTS

| | | | |
|---|---|---|---|
| EP | 0 208 554 B1 | | 10/1990 |
| EP | 0 592 462 B1 | | 4/1994 |
| FR | 1 597 609 | | 6/1970 |
| JP | 3064043 | * | 3/1991 |
| JP | 4309480 | * | 11/1992 |
| JP | 07-048189 | | 2/1995 |
| JP | 63220991 | * | 9/1998 |

OTHER PUBLICATIONS

WO 02/002971 A3 for PCT Application No. PCT/US01/21536 with International Search Report, Form PCT/ISA/210, dated, Apr. 19, 2002.

I. Etsion and L. Burstein, "*A Model for Mechanical Seals with Regular Microsurface Structure©*", Presented as a Society of Tribologists and Lubrication Engineers paper at the STLE/ASME Tribology Conference in Kissimmee, Florida Oct. 8-11, 1995.

Lai, Tom, "*Development of Non-Contacting, Non-Leaking Spiral Groove Liquid Face Seals©*", Presented as a Society of Tribologists and Lubrication Engineers paper at the STLE/ASME Tribology Conference in New Orleans, Louisiana, Oct. 24-27, 1993.

I. Etsion, "*The Effect of Curvature on the Load Carrying Capacity in Eccentric Gas Thrust Bearings©*", Presented at the 35th STLE/ASME Tribology Conference in Fort Lauderdale, Florida, Oct. 16-19, 1989.

* cited by examiner

SEAL RING AND METHOD OF FORMING MICRO-TOPOGRAPHY RING SURFACES WITH A LASER

This is a Continuation of International Application No. PCT/US01/21536, filed Jul. 5, 2001, which International Application was published in English and claims priority from U.S. Provisional Patent Application Ser. No. 60/215,981, filed Jul. 5, 2000.

FIELD OF THE INVENTION

The invention relates to a seal ring for rotating shafts and more particularly, to a seal ring having a micro-topography seal face formed by a laser.

BACKGROUND OF THE INVENTION

To seal rotating shafts of pumps, compressors and the like, it is known to provide a non-contacting shaft seal on the shaft, which includes an axially adjacent pair of seal rings wherein one seal ring rotates with the shaft and the other seal ring is non-rotatably connected to a seal housing. The seal rings each include an end face which faces axially wherein the seal faces are disposed in close opposing relation to define a sealing region extending radially between the outer and inner diameters of the seal rings. The fluid being sealed can either be a liquid or a gas, and the sealing region prevents or minimizes migration or leakage of the fluid radially across the seal faces.

More particularly, the seal faces typically are disposed in contact with each other when the shaft is not rotating to thereby define a static seal. Further, at least one of the seal faces includes a hydrodynamic face pattern that generates a fluid film between the seal faces during shaft rotation to reduce if not eliminate contact between the seal faces.

Hydrodynamic face patterns are known and include wavy faces, spiral grooves, T-grooves and the like. The face patterns are formed in the seal faces through various processes and typically involve providing a flat face and then removing material from the seal face to a very small depth.

For example, U.S. Pat. No. 5,529,317 (Muller) discloses several seal face patterns wherein one of the seal face patterns includes stepped hollows in the seal face that creates a hydrodynamic load support between the seal faces during shaft rotation. The rectangular stepped hollows are formed by means of laser beams which are applied in an overlapping manner.

While a rectangular shaped laser beam may be used to form the rectangular steps of the '317 patent, it has been found that when two adjacent passes of a laser beam overlap, the area of overlap between each adjacent pair of passes has an excessive depth since the overlap area is cut once on the first pass and then cut again on the second pass. In particular, during each pass, the laser beam removes a fixed amount of the seal ring material therefrom by material ablation wherein the ring material is vaporized. For areas that do not overlap, equal amounts of material are removed. However, in each area where the laser beam passes overlap, material is removed during each pass such that the overlap area has been cut deeper and therefore forms an overlap groove having a depth which is greater than the non-overlapped areas. Further, when a rectangular laser beam is used, the opposite ends of each groove formed by a pass of the laser are rectangular and as a result, adjacent ends are stepped across the seal face.

It therefore is an object of the invention to provide a seal ring having micro-topography features formed by multiple passes of a laser beam wherein the beam is shaped to prevent formation of overlap grooves having an excessive depth greater than the desired depth of the feature being formed. It is a further object of the invention to provide a method of forming micro-topography features in the seal ring which blends the laser cuts such that the peripheral edge or boundary of the micro-topography features is cut to a high degree of precision.

To achieve these objectives, the invention generally relates to a seal ring having precisely defined micro-topography depth features in the seal face and a method for forming these micro-topography features.

The micro-topography features are formed in the seal face by a shaped laser beam which removes material in multiple passes along the seal face. During formation of the micro-topography features, the laser beam first cuts through one or more passes along the same beam path to define a cut or groove. To form cuts having an increasing depth in the center thereof as is typically required for a wavy face seal, each successive pass on a single cut is shorter than the preceding pass so that more ablation passes are applied in the center of the cut than at the end of the cut. As a result, the cut has a variable depth whereby the depth increases or tapers away from at least one and possibly both of the opposite ends. The laser beam not only cuts multiple ablation passes along the same beam path, but also is shifted sidewardly to cut along adjacent beam paths. As a result, one or more additional adjacent or contiguous cuts or grooves ultimately define a micro-topography feature such as a valley of a wavy face, a radial groove or the like.

The method of the invention provides micro-topography depth features which are more precisely and accurately defined to improve performance of the seal ring. As the laser beam cuts the grooves one next to the other, each successive ablation pass along the groove overlaps the prior beam passes of the sidewardly adjacent groove to ensure complete coverage of the area of the seal surface on which the micro-topography feature is being formed and blend the edges of the sidewardly adjacent grooves together.

In this regard, the laser beam is shaped by a mask into a predefined geometric shape which illuminates the cutting surface whereby the opposite sides of the beam shape have non-linear side edges. These side edges define areas of the beam which will overlap with successive beam passes. For example, the mask in one embodiment includes a circular aperture through which the laser beam passes and is shaped so that the laser beam when striking the seal ring has a circular cross-section.

As the laser beam and seal ring move relative to each other during a continuous cutting process, the circular laser beam shape travels longitudinally and cuts a continuous ablation groove which is semi-circular when viewed from the side. The non-linear side edges of the beam travel longitudinally to define the opposite sides of the ablation groove. Due to the shape of the beam, the depth of the semi-circular groove is non-uniform along the lateral width thereof since a greater amount of ring material is removed at the center region and less material is removed from the opposite side edge regions of the laser beam. The shallower side regions define overlap areas that overlap an adjacent laser beam pass.

Unlike a rectangular shaped beam, the overlap areas of a beam having non-linear side edges may overlap to a significant degree, for example, up to 25% of a circular beam width yet the depth of the overlap area does not exceed the desired depth of the non-overlap areas. This thereby prevents formation of overlap grooves in the overlap area which exceed the maximum depth of the micro-topography feature being formed.

Besides a circular shaped laser beam, the beam may also be shaped to have other non-circular shapes. For example, the laser beam may have an elliptical shape or alternatively have linear edges in a center section with non-linear generally arcuate sections at the opposite ends of the center section. The arcuate side sections may be defined by continuous curves or by short linear sections which effectively define an arc. In these alternate beam shapes, the opposite side edges of the beam are non-linear to define an ablation cut in the seal face having a non-uniform depth.

The inventive seal ring and method for forming the seal ring provide distinct advantages in the formation of micro-topography depth features. For example, by providing a shaped laser beam and optimizing the overlap of the beam cuts, the inventive method eliminates or controls undesirable excessive-depth grooves in the overlapping areas extending along the sides of adjacent beam passes, and furthermore blends the ends of adjacent beam cuts to provide a boundary of the micro-topography features which are more arcuate or curved than the rectangular generally stepped edges resulting from a rectangular shaped laser beam.

The inventive method in the seal ring thereby not only provides a more repeatable and accurate manufacturing process, but also provide a significantly improved ability to construct a wide variety of micro-topography features.

Other objects and purposes of the invention, and variations thereof, will be apparent upon reading the following specification and inspecting the accompanying drawings.

BRIEF DESCRIPTON OF THE DRAWINGS

Figure 1:
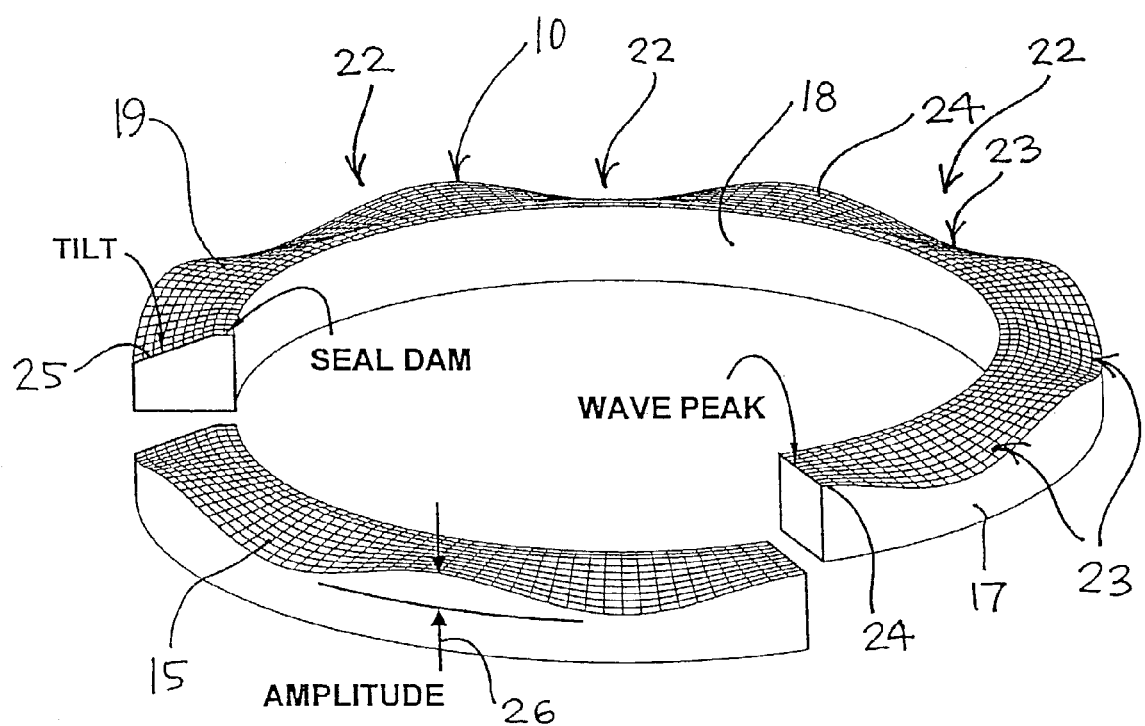
FIG. 1 is an exploded perspective view of a seal ring having a wavy faced micro-topography feature.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 2A:
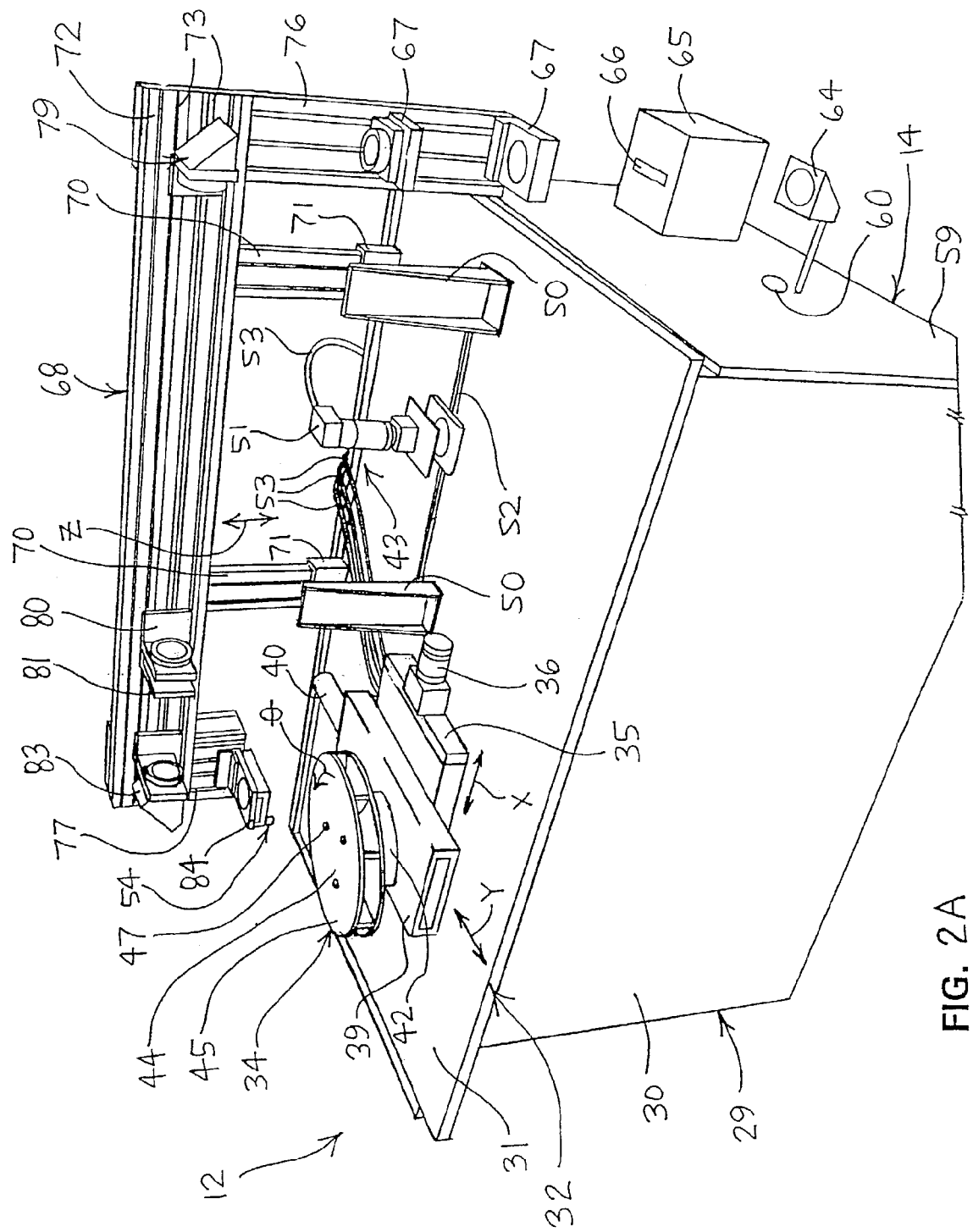
FIG. 2A is a perspective view of a seal ring manufacturing machine which includes an excimer laser and a support table which supports a seal ring thereon for forming micro-topography features in the seal face by the laser.
Figure 2:
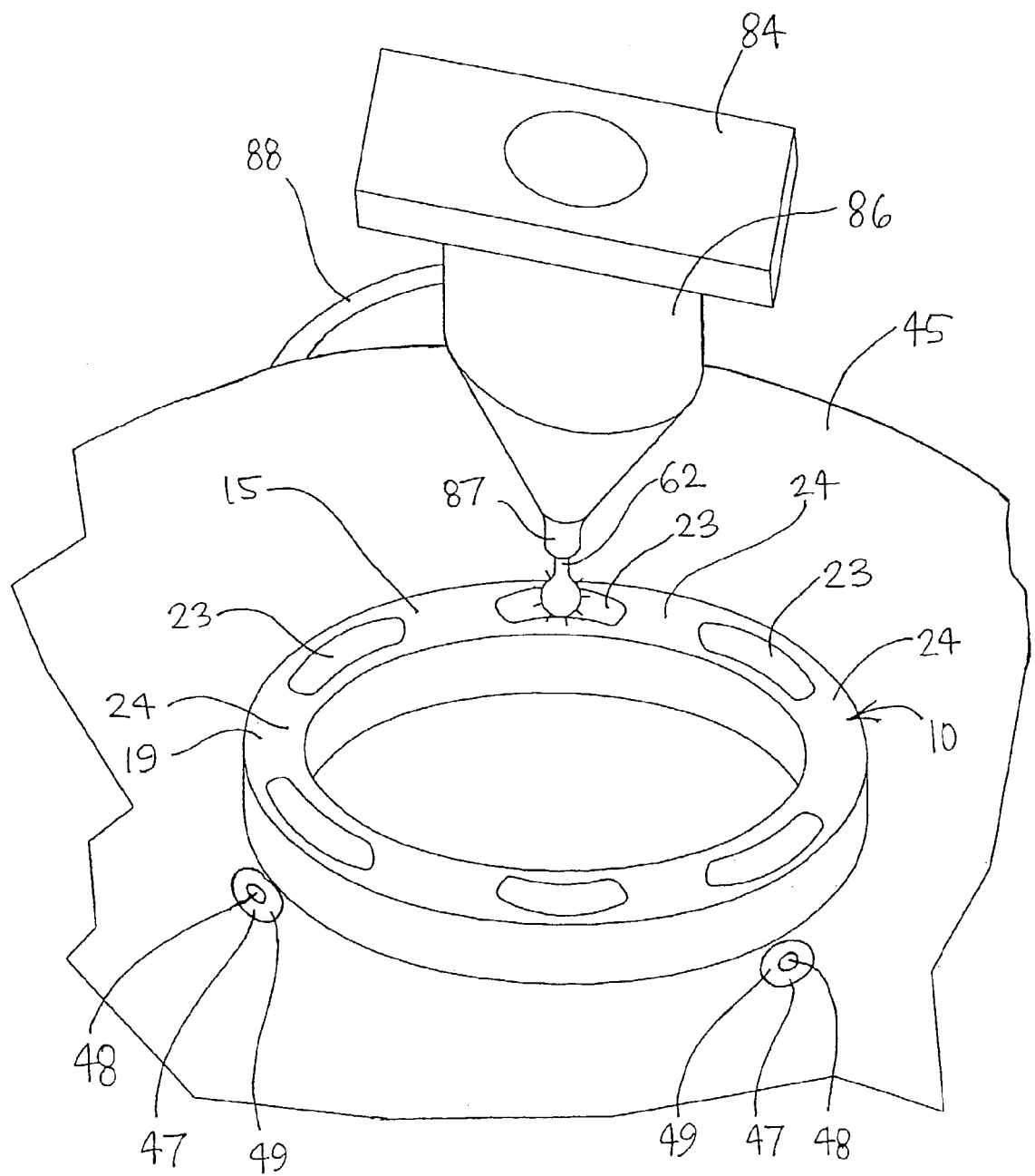
FIG. 2B is an enlarged side perspective view of a seal ring being formed with micro-topography seal face features.

Referring to FIGS. 1, 2A and 2B, the invention relates to a seal ring 10 (FIG. 1) for a shaft seal and to seal ring machining equipment 12 which has a laser unit 14 that forms micro-topography depth features in the seal face 15 of the seal ring 10. As described in greater detail herein, the laser unit 14 generates a shaped laser beam which has non-linear edges at least on opposite sides of the beam to provide successive cuts in the seal face 15 wherein the cuts have a non-uniform depth across the lateral width thereof to permit beam overlap and more accurately and precisely define the micro-topography depth features.

With respect to the seal ring 10 of FIG. 1, the seal ring 10 is formed for use in a generally conventional manner in that the seal ring 10 has an annular shape defined by an outer diameter 17 and an inner diameter 18. The seal face 15 extends radially between the outer and inner diameters 17 and 18 and defines a sealing region 19 which extends radially therebetween. When the seal ring 10 is installed as part of a shaft seal on a rotating shaft of a pump, compressor or other similar piece of equipment, the seal face 15 is adapted to face axially in facing relation with an opposing seal face of another seal ring.

The structure and function of opposing pairs of seal rings to define a shaft seal (commonly referred to as a mechanical seal) is well known and a detailed discussion as to the construction of the shaft seal is not provided herein. Such construction is illustrated in U.S. Pat. No. 5,833,518 owned by the assignee hereof. The disclosure herein is directed to the specific shape and features of the seal ring 10 and its formation by the seal ring machining equipment 12.

The seal ring 10 is illustrated in FIG. 1 as having micro-topography depth features in the form of a wavy face. In particular, the seal face 15 has an annular seal dam 20 on the inner diameter 18 thereof which is adapted to contact an opposing seal face. The seal dam 20 defines an annular region which prevents fluid leakage radially across the sealing region 19 during non-rotation and start-up conditions. While the seal dam 20 is located on the inner diameter 18, the seal dam 20 may be positioned at other radial positions such as the outer diameter 17.

The seal face 15 further includes a plurality of circumferentially adjacent waves 22 wherein each wave 22 includes a valley 23 disposed circumferentially between a pair of wave peaks 24. In the illustrated seal ring 10 of FIG. 1, the cross-sectional shape of the seal ring 10 at each wave peak 24 is rectangular such that the seal ring 10 has a uniform thickness at this location. The thickness of the seal ring 10, however, decreases circumferentially away from the wave peaks 24 along the outer diameter 17 in a generally sinusoidal manner and radially away from the seal dam 20. As a result, each valley 23 has a tilt or declined surface 25 which extends radially outwardly away from the seal dam 20 whereby the difference in thickness between the wave peaks 24 and the valley 23 is defined as the amplitude 26 of the waves 22. As can be seen, each wave 22 has variable depth in two directions, namely radially and circumferentially.

This wavy face thereby defines a hydrodynamic seal which generates a fluid film between opposing seal faces 15 during shaft rotation and thereby reduces friction and minimizes or eliminates contact across the sealing region 19. The actual topography of the seal face is further illustrated by a rectangular topographical graph which is shown on the seal face 15 for illustrative purposes.

The general principal of using a wavy face on a seal ring is known. In known wavy face seals, such wavy faces are formed by: first applying a shrink band which compresses the outer diameter of a seal ring and distorts the seal ring; lapping the seal face; and then removing the shrink band to eliminate the distortion whereby the resultant seal face has a wavy shape. This shrink-band process, however, permits formation of a seal ring having only a limited number of waves with limited amplitude, and involves checking of all seal rings in a manufacturing batch to ensure the wavy faces are formed within required parameters. As described in further detail hereinafter, these disadvantages are overcome wherein the seal ring machining equipment 12 allows for the formation of a wavy face by the laser unit 14 with increased flexibility, accuracy, precision and efficiency.

While much of the following discussion addresses the formation of wavy faced seal rings, the laser unit 14 of the invention also may be used to form other micro-topography depth features such as radial or spiral grooves, T-shaped grooves and other features, particularly those features which have a size that requires multiple passes of a laser. Further, similar to the wavy face seal, these other depth features may have a variable depth in or more directions.

While additional processes are known for forming these depth features, these known processes also may have limitations and it may be difficult to form seal faces with distinctly different types of depth features on the same seal face. The seal ring machine equipment 12 and the method thereof do not have such limitations.

Referring to FIG. 2A, the seal ring machining equipment 12 includes a worktable 29 comprising a base 30 and a horizontally enlarged tabletop 31 which is supported on the base 30. The tabletop 31 has a seal ring support assembly 32 which is adapted to support the seal ring 10 thereon.

The support assembly 32 provides four-axis adjustment for adjusting the position of the seal ring 10 during a cutting operation since the laser remains stationary during use. In this regard, a support table 34 is provided on which the seal ring 10 is supported wherein the support assembly 32 includes an x-axis slide unit 35 having a controller motor 36 for moving the support table 35 along the x-axis as generally illustrated in FIG. 2A.

Additionally, a y-axis slide unit 39 is provided which is supported on the x-axis slide unit 35 so as to be movable therewith along the x-axis. The y-axis slide unit 39 supports the support table 35 on the top surface thereof and is movably connected to a control motor 40 for selectively moving the support table 35 along the y-axis.

More particularly as to the support table 34, the support table 34 is rotatably supported on the upper surface of the y-axis slide unit 39 and is rotatably connected to a motorized rotary table 42. The motorized rotary table 42 is selectively rotated to adjust the angular position of the seal ring 10 supported thereon. A further Z-axis slide unit 43 is provided as will be described herein to provide the four-axis adjustability.

To support the seal ring 10, the support table 34 includes an upper surface 44 defined by a circular plate 45. The seal ring 10 is positioned on the plate 45 and then clamped in place by three stops 47 which project upwardly from the plate 45. Each stop 47 is defined by an upstanding rod-like projection 48 and a resilient o-ring 49 on the projection 48. The stops 47 are movable simultaneously together radially outwardly to provide enough clearance for positioning of the seal ring 15 therebetween, and radially inwardly for gripping the outside diameter 17 of the seal ring 10. Accordingly, the seal ring 10 is clamped onto the support table 34 and then the position of the seal ring 10 can be adjusted along the x-axis, y-axis and the angular position theta can also be adjusted. The support table 34 further provides for rotation of the seal ring 10 through multiple revolutions wherein the laser unit 14 cuts grooves circumferentially along the seal face 15 at a cutting radius, and then the x-axis and y-axis position of the seal ring 10 is adjusted to provide successive cuts at different cutting radiuses.

To provide adjustment in the vertical z-axis, the seal ring support assembly 32 further includes the z-axis slide unit 43 which comprises a pair of sidewardly spaced apart upright support posts 50 which are adapted to support components of the laser unit 14 thereon. The seal ring support assembly 32 also includes a drive motor 51 and a drive belt 52 extending horizontally between drive motor 51 and precision linear slides 71 mounted to the posts 50 for adjusting the vertical height of the laser unit components.

All of the motors of the seal ring support assembly 32 are connected to a computer control unit by appropriate control cables 53. The control unit is programmable so that the various motors 36, 40 and 51 as well as the rotary table motor which rotates the support table 34 are selectively operated to control the position of the seal ring 10 for laser machining of the seal face 15. The control unit is run using the computer program Labview which is commercially available.

Figure 3:
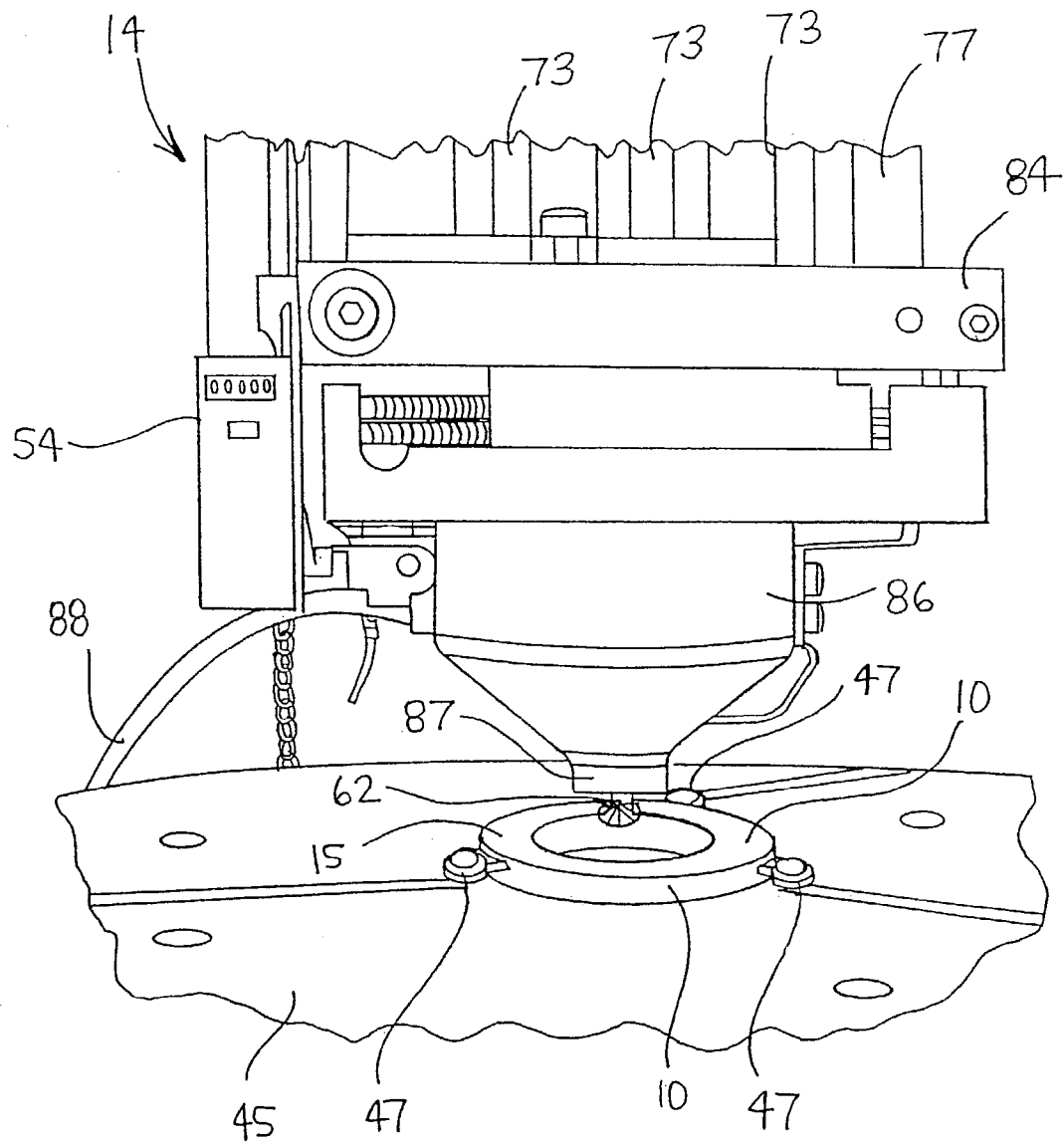
FIG. 3 is a front perspective view of the seal ring on the support table during the laser machining process.

A displacement laser 54 (FIGS. 2A and 3) also is provided which is directed toward the seal ring 10 and is connected to the control unit to identify the initial position of the seal ring 10 relative to the final objective lens 84 of the laser and permit precise control of the position of the seal ring 10. During the start of the laser cutting process, the seal ring 10 is moved below the displacement laser 54 and the z-axis position is adjusted so that the proper focal length for the laser is provided.

Depending upon the programming of the control unit, the laser unit 14 not only is used to define a wavy face on the seal ring 10 but also may be used to define other micro-topography features such as spiral grooves and the like.

Turning to the laser unit 14 as illustrated in FIG. 2A, an excimer laser 59 is provided within the base 30 and includes a laser beam exit port 60 which opens sidewardly therefrom. The excimer laser 59 is a krypton fluoride (KrF) laser which operates in the ultraviolet wavelength region of about 248 nanometers. This laser is selected since little if any heat is produced in the seal ring 10 when forming the microtopography features.

Generally, the laser 59 generates a laser beam 62 (FIG. 2B) which contacts the seal face 15 and removes material therefrom by ablation. To direct the laser beam 62 from the exit port 60 on the side of the base 30 to the seal ring 10 provided on the top of the tabletop 31, a series of lenses and mirrors are provided.

More specifically, the laser beam 62 exits sidewardly and strikes a turning mirror 64 which is supported on a side of the base 30 to redirect the beam upwardly to an attenuator 65 that is mounted to a side of the base 30. The beam 62 then exits upwardly from an attenuator port 66 to a vertically spaced apart pair of homogenizer lenses 67 that are supported on a support rail arrangement 68.

As to the support rail arrangement 68, this arrangement includes a pair of upright rails 70 wherein the lower ends of the rails 70 are slidably connected to the posts 50 by the linear slides or vertical actuators 71. The actuators 71 connect the rails 70 and posts 50 together whereby the above-described drive motor 51 is selectively operated to displace the entire support rail arrangement 68 vertically along the z-axis.

The upper ends of the rails 70 support a horizontal optics rail 72 wherein the optics rails 72 includes a plurality of horizontal slots 73 for slidably supporting optical components thereon. The rearward end of the optics rail 72 has a downwardly depending support rail 76 on which the homogenizer lenses 67 are slidably supported. The lenses 67 may be adjusted vertically for adjusting the characteristics of the laser beam 62. Additionally, the opposite end of the optics rail 72 further includes another downwardly depending support rail 77.

With respect to the optics rail 72, a first turning mirror 79 is provided directly above the homogenizer lenses 67 to receive the beam therefrom and redirect the beam sidewardly along the length of the optics rail 72. Proximate the other end of the optics rail 72, a field lens 80 is slidably supported on the rail slots 73 which lens 80 further includes a generally rectangular mask 81 adjacent thereto on the downstream side of the field lens 80. As will be described in further detail herein, the mask 81 serves to shape the laser beam prior to application of the laser beam 62 to the seal ring 10.

The shaped laser beam 62 thereby travels horizontally downstream from the field lens 80 and is redirected downwardly by another turning mirror 83. Lastly, the shaped laser beam 62 passes through a final objective lens 84 and then projects downwardly onto the seal face 15 as generally illustrated in FIG. 2B.

To prevent contamination of the final objective lens 84 particularly in view of the proximity of the final objective lens 84 to the rotary support table 34, the final objective lens 84 also includes a funnel-like shroud 86 (FIGS. 2B and 3) having a downward opening exit port 87. An air feed 88 is connected to the shroud 86 and provides an air flow into the shroud 86 which air flow blows downwardly through the exit port 87 so that any debris from the laser process is blown away from the objective lens 84.

During operation, the laser is selectively turned on, i.e. fired or pulsed, to cut and vaporize seal ring material as the laser beam 62 is applied to an exposed area of the seal ring 10. By selectively turning the laser on and off, circumferentially spaced apart cuts may be made to the seal ring.

In the illustrated embodiment, the seal ring support assembly 32 not only positions the seal ring 10 relative to the laser beam 62, the seal ring support assembly 32 also effects rotation of the seal ring 10 by the rotary table 34 relative to the laser beam 62. This thereby creates circumferential cutting of the seal face 15 during pulsing of the laser beam 62, although it also should be understood that it is possible to shift the seal ring 10 in the x-axis and y-axis directions to effect linear displacement of the seal ring 10 if desired rather than just rotatable displacement thereof. Further, it will be understood that relative movement between the laser beam 62 and seal ring 10 may be provided with a movable laser beam 62 wherein the seal ring 10 instead is kept stationary, or even simultaneous movement of both the laser beam 62 and seal ring 10.

With respect to the mask 81, this mask serves to shape the laser beam 62 to a desired cross-sectional shape which optimizes cutting of the seal ring 10. For example, as diagrammatically illustrated in FIG. 4, the mask 81 is a rectangular thin plate preferably formed of a stainless-steel material although a thin sheet of other suitable material may be used. While a mask 81 is provided along the length of the beam, the mask 81 can be positioned at other locations, and further, any other shaping device which shapes the laser beam 62 alternatively may be used.

The mask 81 includes therein a shaping aperture or hole 90 which opens horizontally therethrough and has a predefined geometric shape. The hole 90 is shown substantially enlarged although it will be understood that the aperture 90 has a significantly smaller diameter relative to the dimension of the plate 81. Preferably, the shaping aperture 90 has a diameter of 0.4 to 0.5 inches, and the beam is demagnified by the objective lens 84 to form a beam shape diameter of 0.04 to 0.05 inches. The objective lens 84, however, is adjustable to vary the demagnification of the beam 62.

Figure 5:
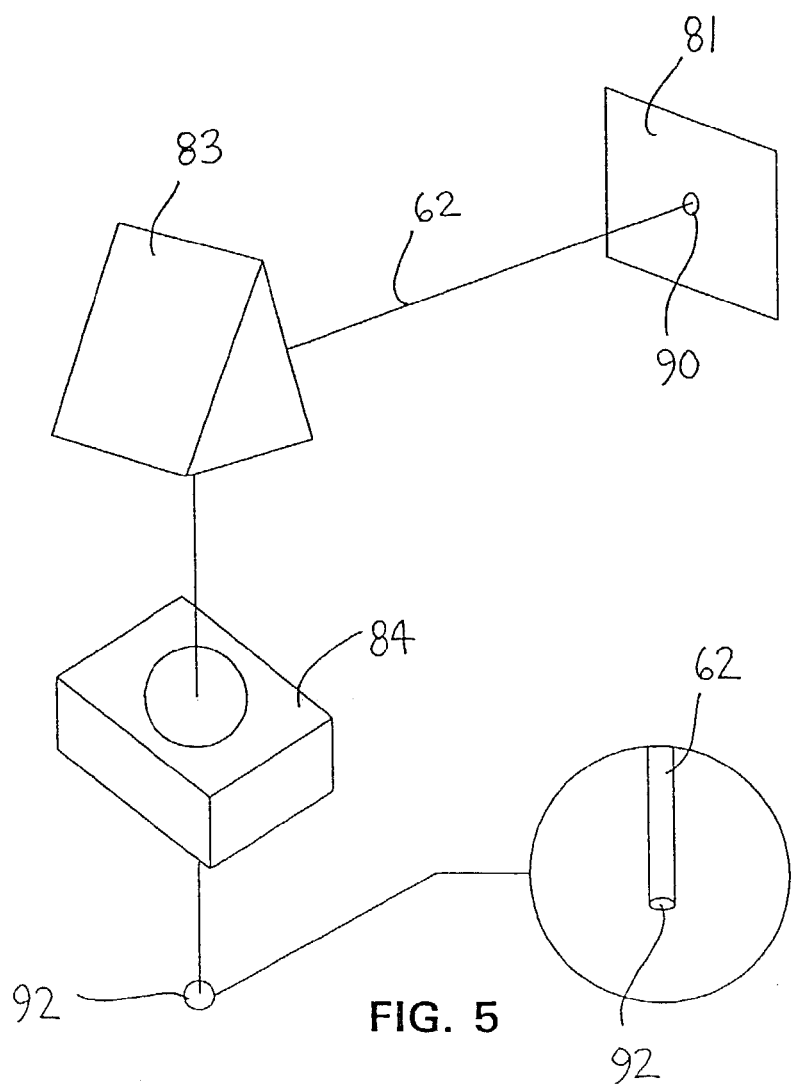
FIG. 5 is a diagrammatic pictorial view illustrating the mask and additional downstream lenses disposed above the support table.

As seen in FIG. 5, the shaped laser beam 62 exits the aperture 90 of the mask 81, and is redirected downwardly to the final objective lens 84 through the turning mirror 83. Thereafter, the shaped laser beam 62 illuminates the seal face 15 of the seal ring 10 with a substantially circular beam shape defined at the terminal end 92 of the laser beam 62. The circular beam end 92 defines the exposed area of the beam 62 on the seal face 15 and defines the area in which ablation or vaporization of the seal ring material occurs.

Figure 4:
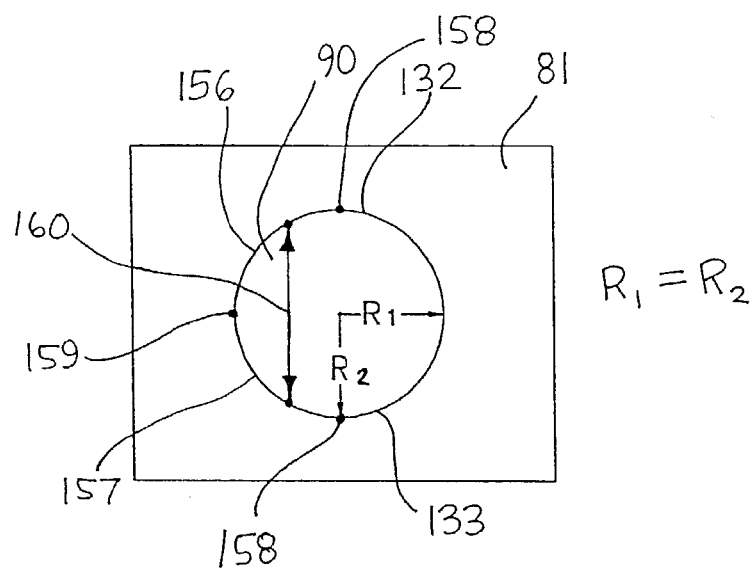
FIG. 4 is a front elevational view diagrammatically illustrating a mask which shapes the laser beam into a circular.

More particularly with respect to FIG. 4, first and second radiuses $R_1$ and $R_2$ of the shaping aperture 90 are identified therein. Since the illustrated aperture 90 is a circle, the first and second radiuses are equal. These radiuses, however, are identified separately since the first radius $R_1$ extends horizontally of the mask 81 and due to redirection of the beam 62, thereby defines the lateral width of the laser beam end 92 on the seal face 15.

In particular, the lateral width of the beam 62 is twice the first radius or in other words is defined by the diameter of the circular shaping aperture 90. Due to the orientation of the seal ring 10 relative to the beam 62, the lateral width of the beam 62 extends radially on the seal face 15. The second radius is oriented perpendicular to the first radius and defines the length of the beam end 92, which due to the orientation of the seal ring 10 extends circumferentially along the seal face 15 in the direction along which the laser beam 62 travels.

Figure 6:
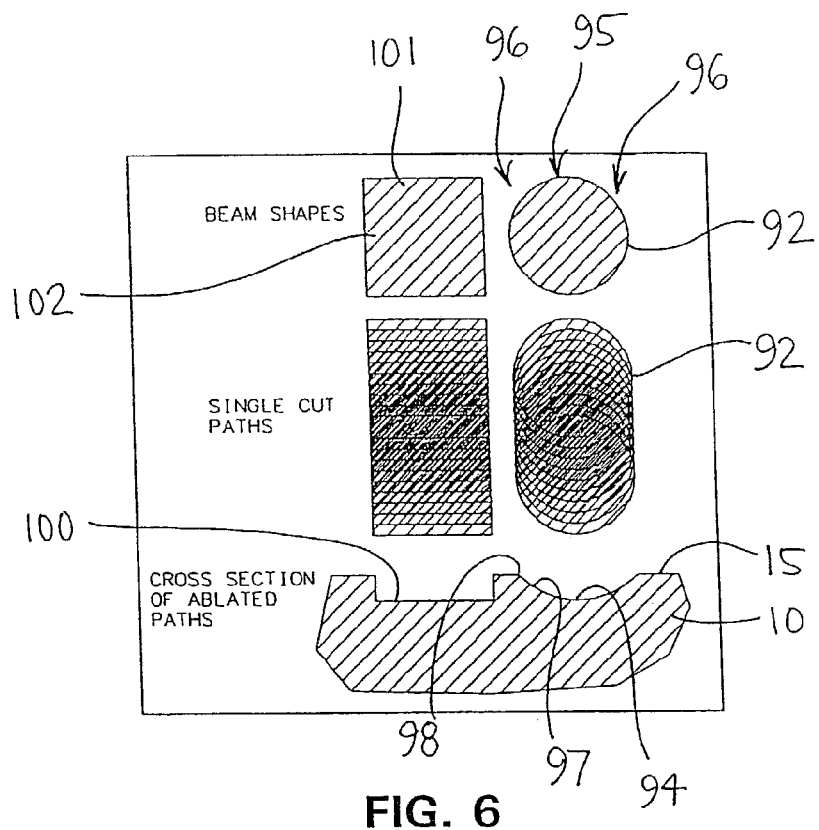
FIG. 6 is a diagrammatic view illustrating a plan view of a square laser beam shape and a circular laser beam shape, and further illustrating a side elevational view of the groove cross-sections defined by the respective beam shapes.

Referring to FIG. 6, the beam end 92 moves progressively along the seal face 15 due to the relative rotation of the seal ring 10 and the laser beam 62. Since continuous relative movement is provided therebetween, a circumferentially elongate ablation cut or groove 94 is defined in the seal face 15. Due to the circular shape of the beam 62, more laser energy passes through the central section 95 of the mask opening 90 and less energy passes through the side regions 96 of the circular beam shape. As a result, the circular beam shape defines a groove 94 that has a semi circular interior surface 97 which is deeper in the middle thereof and shallower along the longitudinal side edge sections 98 of the ablation cut 94.

The shape of the ablation cut 94 thereby distinctly differs from the shape of an ablation cut 100 that is otherwise defined by a laser beam 101 having a square shape. The circular beam shape provides distinct advantages as described in further detail herein.

Turning first to the rectangular shaped beam 101, the laser unit 14 of the invention was tested with a square or rectangular opening in the mask 81 to shape the laser beam 62 with the square shape diagrammatically illustrated in FIG. 6. The resulting rectangular cut 100 has a uniform depth across the entire radial width, whereby the seal ring 10 (as illustrated in FIG. 7) was rotated so that the seal surface 15 moved circumferentially relative to the laser beam end 102 (FIG. 6).

Figure 7:
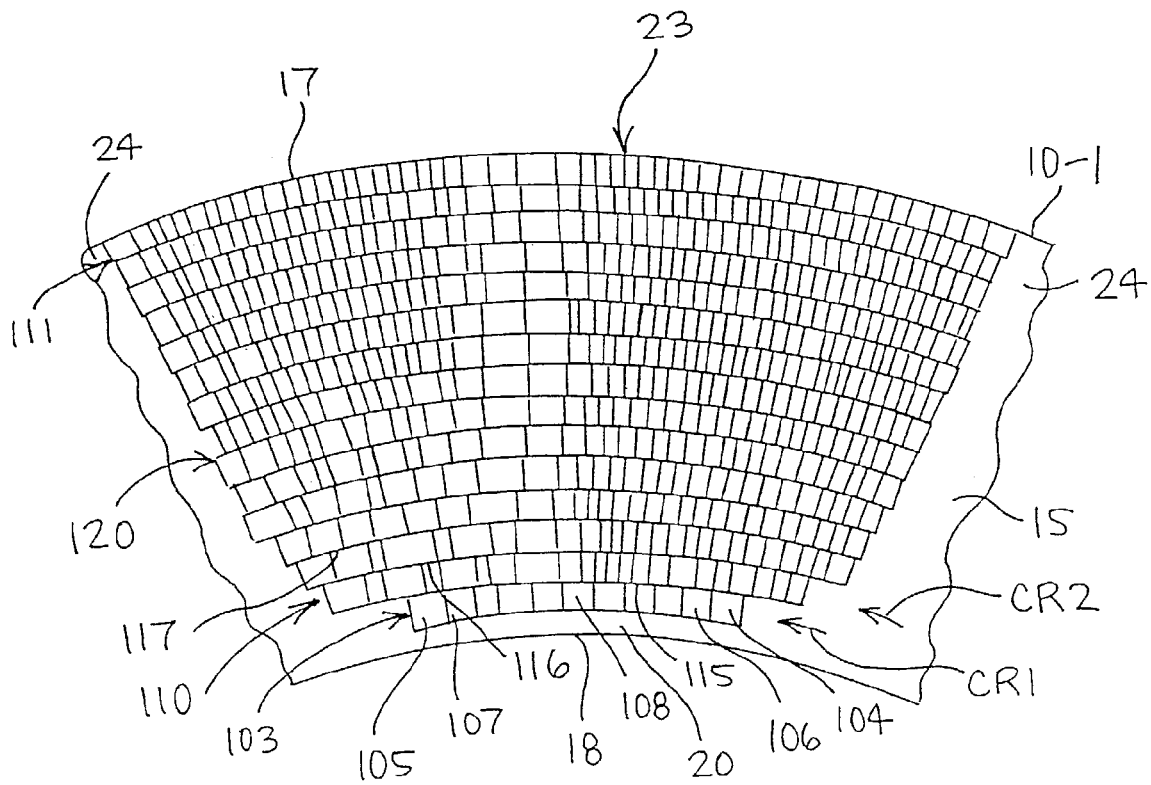
FIG. 7 is an enlarged plan view of a section of a wavy-faced seal ring formed with a rectangular shaped laser beam.

This rectangular laser beam 101 was used to define a wavy shaped seal ring wherein one circumferential section of the seal ring is diagrammatically illustrated in FIG. 7. In the construction of the illustrated seal ring 10-1 with the laser unit 14 of the invention, a valley 23 is formed which is defined between a circumferentially spaced apart pair of peaks 24 and radially outwardly of a sealing dam 20. The wavy face was formed by starting in the shallower end of the valley 23 near the sealing dam 20 and then cutting additional ablation cuts radially outwardly therefrom. The peaks 24 and sealing dam 20 are defined by the original seal surface outside of the boundary of the valley 23 and thus, no laser cutting was performed in these areas.

More particularly, the process of the invention was tested with a rectangular aperture mask. The valley 23 is formed by moving the laser beam 101 through a first plurality of passes along a first cutting radius CR1 to cut a first ablation cut 103 having a desired shape. The first pass at this first cutting radius CR1 is initiated at a first circumferential location 104 wherein the laser beam 101 is pulsed on or fired and continued through a circumferentially spaced apart second location 105 wherein the laser beam 101 is pulsed off to cause ablation of the seal ring material along the circumferential length defined between these locations 104 and 105. The depth of this first cut is uniform across the radial width thereof as generally indicated by FIG. 6 and is uniform along the circumferential length thereof. During the next successive revolution of the seal ring 10 by rotation of the support table 34, the laser beam 101 is fired at location 106 and turned off at location 107. Additional cutting passes are provided at the first cutting radius during successive revolutions of the seal ring 10. The first cut 103 has a longitudinal depth which progressively increases away from the opposite ends defined at locations 104 and 105 to the deepest location defined by the sixth cutting pass at location 108.

Once the first ablation cut 103 is completed, the seal ring 10 is moved radially relative to the beam end 102 so that the laser beam 101 now cuts along a second cutting radius CR2 which is located radially outwardly of the first cut radius CR2 and defines a second cut 110. This second cut 110 has a longer circumferential length than the first cut 103 and is formed by a greater number of passes then the first cut 103 so as to have a greater depth but otherwise is cut with the same process as the process discussed above.

As each cut is completed by one or mare passes of the laser beam 62, the seal ring 10 is shifted radially relative to the beam 101 such that the ablation cuts are shifted progressively outwardly to greater cutting radiuses until the final cut 111 is completed along the outer radius 17. As a result of this cutting process, each cut such as cut 103 is contiguous to the next radially outward cut such as cut 110 wherein these adjacent ablation cuts 103 and 110 are disposed sidewardly adjacent to each other in contiguous relation.

If the sealing dam 20 is at the outer diameter 17, the process remains the same except that the laser beam 62 starts near the outer diameter 17 and is progressively shifted radially inwardly so that the cutting radiuses progressively decrease.

It was found, however, that the rectangular laser beam 101, even with this circumferential cutting process, results in excessive depth grooves being formed between contiguous ablation cuts which is a problem similar to that which occurred in prior processes used to define seal faces with lasers.

Figure 8:
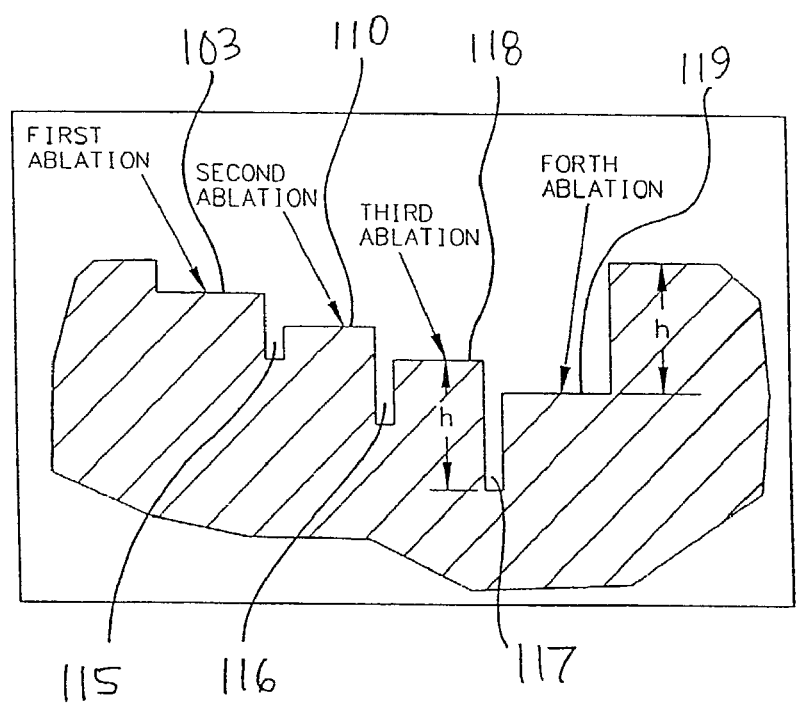
FIG. 8 is a side cross-sectional view of excessive depth grooves defined in the seal face as a result of multiple ablations with a rectangular shaped laser beam.

More particularly, as illustrated in FIG. 8, the circumferentially elongate sides of contiguous cuts such as cuts 103 and 110 overlap at least to a limited extent which thereby causes a greater amount of ablation in the overlap regions and the formation of an excessive depth groove 115 (FIGS. 6 and 7) therebetween. Similar excessive depth grooves 116 and 117 are defined between a third ablation cut 118 and a fourth ablation cut 119 with the groove 117 being longer than the groove 115. These excessive depth grooves 115, 116 and 117 as well as additional such grooves defined by overlapped contiguous ablation cuts thereby extend along the circumferential length of the ablation cuts. These excessive depth grooves can adversely impact seal performance.

Further, as illustrated in FIG. 7, the rectangular ends of each cut such as the ends 104 and 105 of the first cut 103 define abrupt steps along the peripheral edge or boundary 120 of the valley 23 being formed.

Figure 9:
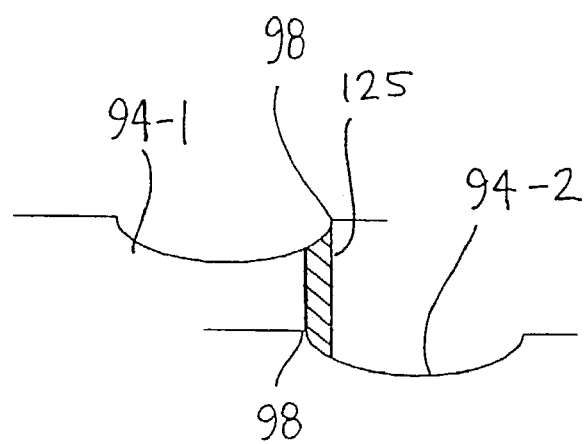
FIG. 9 is a diagrammatic side elevational view illustrating the area of overlap between two overlapping passes with a circular laser beam shape.

With the circular beam shape of FIG. 6 and the semi circular cut 94 resulting therefrom, the cutting process of the laser unit 14 is optimized and the disadvantages associated with the rectangular beam shape are substantially eliminated. Referring to FIG. 9, it is possible to form a first cut generally identified by reference numeral 94-1 and then define a second cut 94-2 which is radially contiguous or adjacent to the first cut 94-1. For illustrative purposes, the first and second cuts 94-1 and 94-2 are vertically offset to more clearly illustrate the area of overlap 125 which is defined therebetween. This area of overlap is defined by the radial distance between one side section 98 of the first cut 94-1 and the side section 98 of the second cut 94-2 wherein overlap area 95 is defined as extending radially between the side sections 98.

Figure 10:
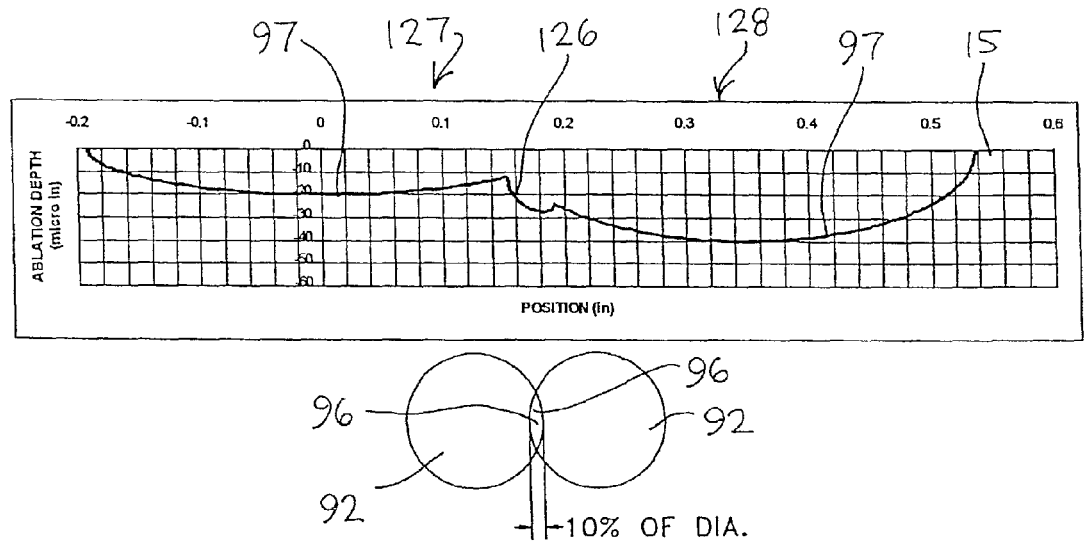
FIG. 10 is a graph illustrating the cross-sectional shape of grooves defined with 10 percent overlap.
Figure 11:
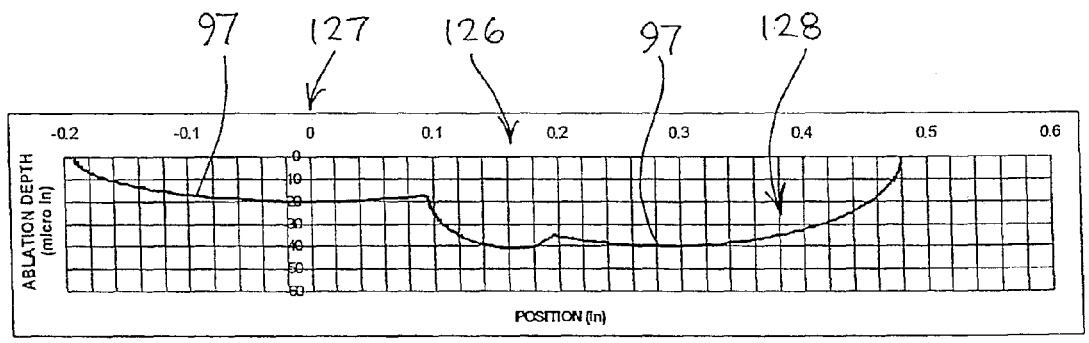
FIG. 11 is a graph illustrating the cross-sectional shape of grooves defined with 25 percent overlap.
Figure 12:
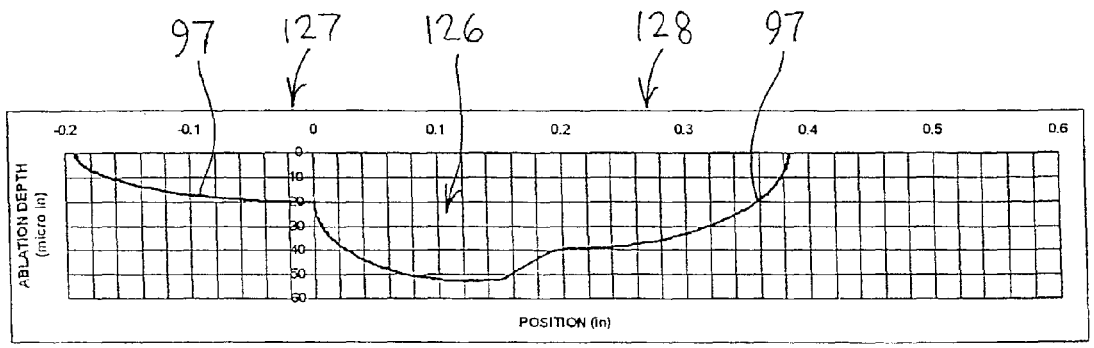
FIG. 12 is a graph illustrating the cross-sectional shape of grooves defined with 50 percent overlap.

Referring to the graphs of FIGS. 10–12, contiguous ablation cuts 127 and 128 formed in the seal ring face 15 are illustrated as well as the final profile of the depth feature formed by the ablation cuts 127 and 128. As shown herein, the area of overlap can be varied while still avoiding the formation of excessive depth grooves which exceed the depth of the ablation cuts 127 and 128. As for these graphs, the ablation depth of the ablation cuts is illustrated along the vertical axis in −10 micro inch increments which are measured negatively from the seal face 15. The horizontal graph axis identifies the radial position along the seal face 15 in 0.1 inch increments measured positively and negatively from a 0 position located approximately at the center of the first ablation cut 127.

With the laser set as illustrated in FIG. 10, the beam end 92 as it is moved through two contiguous cuts 127 and 128 are overlapped by 10 percent of the diameter of the beam end 92. As a result, only a relatively shallow intermediate groove 126 is defined between the adjacent pair of cuts 127 and 128. In particular, the ablation cut 127 is defined by a single pass, and the cut 128 is defined by two passes, i.e. a double pass of the laser beam 62 through two revolutions of the seal ring 10. It will be understood that the profile of the second ablation cut 128 will be substantially the same only deeper if additional beam passes are performed.

More particularly, the single ablation cut 127 has a depth of 20 micro inches, while the radially adjacent double pass or double ablation cut 128 cuts the seal ring 10 to a depth of 40 micro inches into the seal face 15. In the area of overlap, the continuity of the arc of the interior surface 97 is broken in the region of overlap to define the shallow intermediate groove 126. However, the depth of the shallow groove 126 is controlled so as to be less than 30 micro inches and still does not exceed the maximum acceptable depth of 40 micro inches which is the depth of the second ablation cut 128.

FIG. 11 illustrates the resulting profile of the same cutting process except that a 25 percent overlap is provided. Notably the first cut 127 and the second cut 128 have the same maximum depths as the corresponding cuts defined in FIG. 10. However, the middle groove 126 has a greater depth of approximately 40 micro inches. This is close to the maximum 40 micro inch depth of the second cut 128 and thereby reflects a maximum amount of overlap for the circular beam shape 92 which avoids excessive depth grooves.

Referring to FIG. 12, this graph depicts the profile of the cuts 127 and 128 with a 50 percent diameter overlap. Notably, the depth of the intermediate groove 126 is approximately 52 micro inches which exceeds the maximum acceptable depth of the deeper groove 128. This graph therefore establishes that exceeding the 25 percent overlap limit results in excessive depth grooves being formed and indicates that it is undesirable to have an overlap of greater than 25 percent.

With respect to the lower overlap limit, this limit is believed to be zero percent since the depth of the groove 126 decreases with a corresponding decrease in the percentage of overlap and accordingly, with a zero percent overlap, no intermediate groove 126 would be formed.

In view of the foregoing, the circular beam shape is shown to eliminate excessive depth grooves when the percentage overlap is between zero and about 25 percent of the circular beam shape. Notably, the maximum overlap may exceed 25 percent if the seal ring is deemed to operate acceptably with such a groove. Even at 50 percent overlap, the circular beam shape is shown to result in an intermediate groove 126 having a depth which is less than the depth which would result from a rectangular shape beam since the excessive depth groove resulting from a rectangular beam shape would be 60 micro inches.

Figure 13:
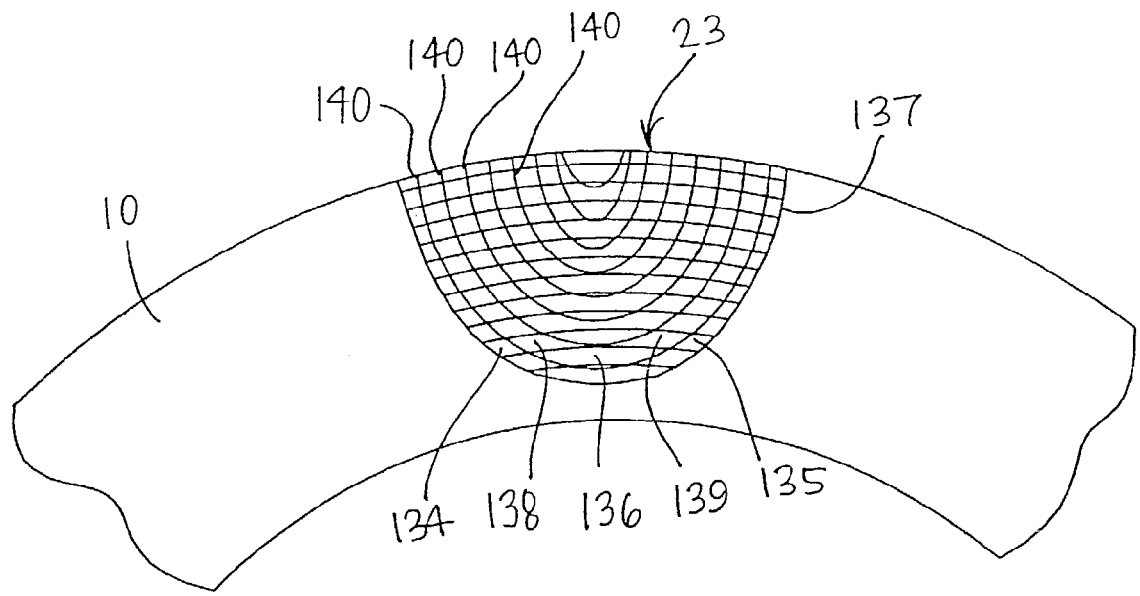
FIG. 13 is an enlarged plan view of a section of a wavy-faced seal ring formed with a laser beam having arcuate edges.

In addition to the reduction and ability to eliminate excessive depth intermediate grooves, the use of the circular shaped beam and the other alternate beam shapes discussed in further detail hereinafter is believed to provide desirable blending of the adjacent edges of each laser cut. In this regard, FIG. 13 diagrammatically illustrates that the stepped peripheral edge 120 resulting from rectangular beam shapes (see FIG. 7) is substantially eliminated with the beam shapes of the invention disclosed herein. In particular, the leading and terminal edges of the circular laser beam identified by reference numerals 132 and 133 (FIG. 4) are arcuate due to the curvature defined by the second radius $R_2$ identified in FIG. 4. Therefore, the leading and trailing ends of each successive cut, such as ends 134 and 135 of cut 136, are curved rather than having a stepped rectangular shape. As such, the resulting periphery or boundary 137, for example, of the valley 23 being defined in the seal ring 10 is believed to have a more blended arcuate shape. This is also true in areas located between the trailing and leading ends 134 and 135 of each cut and specifically, at the opposite ends 138 and 139 of each pass of the laser beam. These ends 138 and 139 define intermediate transition lines which are identified by reference lines 140 in FIG. 13 and extend generally parallel to the boundary line 137.

Figure 14:
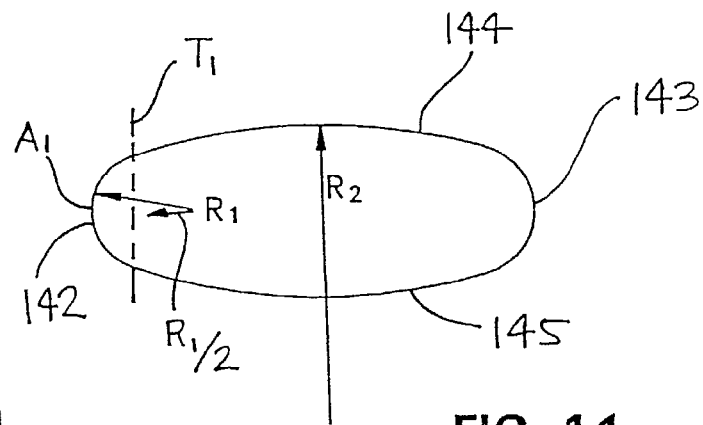
FIG. 14 is a diagrammatic plan view of a first alternate laser beam shape.
Figure 16:
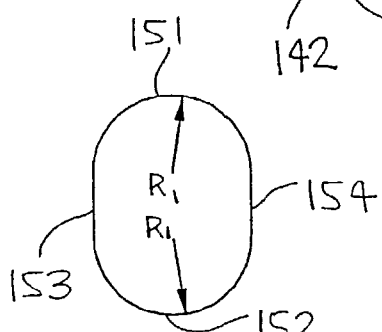
FIG. 16 is a diagrammatic plan view of a third alternate laser beam shape.
Figure 15:
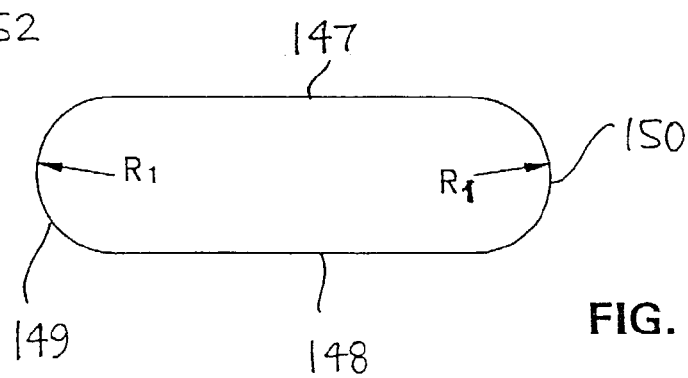
FIG. 15 is a diagrammatic plan view of a second alternate laser beam shape.

In addition to the circular beam shape discussed above, alternate beam shapes are illustrated in FIGS. 14–16 which beam shapes are shaped or created by providing the mask opening 90 with a corresponding shape. With respect to FIG. 14, the opening provided in the mask 81 is elliptical wherein opposite side edges 142 and 143 have a curvature defined by a first radius $R_1$, and leading and trailing end edges 144 and 145 have a curvature defined by a second radius $R_2$ greater than the first radius.

This elliptic beam shape has a greater lateral width to provide a greater width to the ablation cut being formed thereby. Further, if the laser beam exiting the attenuator port 66 is rectangular, the elliptic beam shape maximizes the area of the initial laser beam which is finally used for cutting the seal face.

The overlap limits discussed above relative to FIGS. 10–12 are applicable hereto although the upper limit is converted to about 50% of the radius $R_1$ of the side edges 142 and 143. This limit will also be affected if the transition T1 between the radiuses of curvature of the side edges 142, 143 and the end edges 144, 145 is located at a distance away from the apex A1 of the side edges 142, 143 which is less than half the radius of curvature ($R_1/2$).

Further, the leading and trailing end edges 144 and 145 have a more gradual curvature compared to the circular beam shape which is believed to provide improved blending along the boundary line 137 of the valley 23 being formed.

As to the alternate beam shape of FIG. 15, linear end edges are provided which define the leading and trailing ends 147 and 148 of the beam shape. The opposite side edges 149 and 150 of this geometric beam shape are semi-circular sections having the same radius $R_1$. Preferably the side edges 149 and 150 are half circles so that the overlap limits discussed above relative to FIGS. 10–12 are equally applicable hereto although the overlap limits are 0 to 50% of the radius of each side edge 149 and 150 rather than 0 to 25% of the diameter of the circular beam shape.

A further alternate beam shape is illustrated in FIG. 16, wherein the curved edges 151 and 152 define the leading and trailing ends of the beam while linear edges 153 and 154 define the opposite side edges of the beam shape. This shape is believed to provide similar results as the circular beam shape discussed above.

In all of these alternate beam shapes the opposite side edges generally converge toward the apex thereof so that the longitudinal length of the beam shape progressively decreases from the center thereof. While these side edges could be defined by a pair of linear side edge sections which converge to the apex, the side edge sections are non-linear and preferably are continuously curving such as by arcs, curves or short linear line sections. For example with respect to the circular beam shape of FIG. 4, the side edge sections 156 and 157 are quarter circles which extend laterally from the points 158 and converge to the apex point 159. As a result, the longitudinal length of the side edge regions generally identified by length line 160 decreases non-linearly due to the curvature of the side sections 156 and 157.

These non-linear side edges are found to remove less material along adjacent edges of contiguous ablation cuts so as to be less sensitive to variations in the overlap percentage than would occur if the side edge sections were linear. Accordingly, the non-linear nature of the shaping aperture 90 blends contiguous ablation cuts more effectively and with less sensitivity to overlap accuracy and will result in a cut depth closer to the depth desired.

With the above-described arrangement, the formation of excessive depth grooves between contiguous ablation cuts is eliminated. Further, the ablation cuts are blended in two dimensions, radially between adjacent cuts and circumferentially at the ends of the cuts.

In actual comparative testing of wavy face seals formed by the inventive method and formed by shrink bands, the inventive seal ring 10 is found to have a reduction of gas leakage of up to 25% statically and up to 50% dynamically. This improvement is believed to result from the laser process of the invention including the increased accuracy and precision by which the seal ring is constructed.

Figure 17:
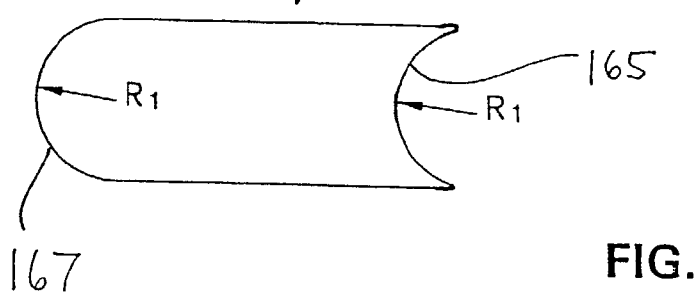
FIG. 17 is a diagrammatic plan view of a fourth alternate laser beam shape.

While the side sections curve or bow outwardly, at least one of these side sections 165 may be inverted so as to bow inwardly toward the center of the beam shape 166 as seen in FIG. 17. This inverted side section 165 thereby has a generally forked shape, and is able to be overlapped with the outward bowing side section 167 on the opposite side of the beam shape 166. The side sections 165 and 167 preferably have the same radius $R_1$.

In operation, the seal ring 10 is constructed as follows: a seal ring is provided preferably having a flat seal face; a laser is provided having a laser beam that is directed to said seal face; the laser beam is shaped so as to have a geometric shape with convergent non-linear side edges so that the cut of the laser beam has a non-uniform depth across the width thereof; a plurality of ablation cuts are provided with said laser beam over at least a portion of the seal face to create one or more micro-topography depth features such as a wavy face, each cut being formed by one or more passes of the laser beam relative to the seal face. The ablation cuts are contiguous to each other wherein the adjacent side edge regions of each pass of the laser beam are overlapped. The adjacent cuts are overlapped to prevent formation of excessive depth grooves.

Although particular embodiments of the invention have been disclosed in detail for illustrative purposes, it will be recognized that variations or modifications of the disclosed apparatus, including the rearrangement of parts, lie within the scope of the present invention.

We claim:

1. A method of forming a seal ring comprising the following steps:
   providing a seal ring wherein said seal ring has a flat seal face;
   providing a laser having a laser beam that is directed to said seal face;
   shaping the laser beam so as to have a geometric shape with convergent non-linear side edges so that the cut of the laser beam has a non-uniform depth across the width thereof; and
   providing a plurality of ablation cuts with said laser beam over at least a portion of the seal face to create one or more micro-topography depth features configured as a wavy face, each said ablation cut being formed by relative movement of said laser beam and said seal ring wherein said laser beam cuts through one or more passes along a beam path to form said ablation cut along said beam path, said laser beam being applied to a plurality of sidewardly adjacent beam paths such that the ablation cuts are located sidewardly contiguous to each other and the adjacent side edge regions of adjacent passes of the laser beam are overlapped and formation of excessive depth grooves is prevented.

2. The method according to claim 1, wherein at least one of said ablation cuts is formed by multiple passes of said laser beam to have a depth greater than a contiguous one of said ablation cuts whereby said micro-topography depth feature has a variable depth in a direction transverse to the beam path.

3. The method according to claim 2, wherein said multiple beam passes are progressively shorter so that said ablation cut has a variable depth along said beam path.

4. A method of forming a seal ring for a mechanical seal wherein said seal ring has micro-topography depth features on a seal face thereof to maintain said seal ring in non-contacting relation with another seal ring during operation, the method comprising the steps of:
   providing a seal ring, wherein said seal ring has said seal face;
   providing a laser proximate said seal ring and directing a laser beam toward said seal face to apply ablation cuts to said seal face wherein said seal ring material is removed;
   shaping said laser beam so as to have a geometric shape wherein said shaped laser beam is applied to said seal face to remove said seal ring material therefrom, at least one of said laser beam and said seal ring being movable relative to the other along beam paths to permit removal of said seal ring material along each said beam path to form said micro-topography depth features;
   said geometric shape being defined by leading and trailing edges which extend transverse to said beam path and are spaced apart in a direction of said beam path, wherein opposite end portions of said leading and trailing edges converge toward each other such that the spacing between said leading and trailing edges progressively decreases in opposite edge portions of said geometric shape; and
   providing a plurality of said ablation cuts to said seal face with said laser beam to create one or more of said micro-topography depth features, each said ablation cut being formed by moving said laser beam relative to said seal face through one or more passes along a respective said beam path and moving said laser beam through a plurality of said beam paths which are sidewardly adjacent such that said ablation cuts are located sidewardly contiguous to each other and have respective said edge portions which are overlapped.

5. The method according to claim 4, wherein said opposite end sections of said leading and trailing edges are non-linear.

6. The method according to claim 5, wherein said geometric shape is circular.

7. The method according to claim 5, wherein said geometric shape is oval.

8. The method according to claim 5, wherein said opposite nonlinear end sections of said leading and trailing edges have linear intermediate sections disposed therebetween.

9. The method according to claim 4, wherein at least one of said ablation cuts is formed by moving said laser beam through a plurality of said beam passes greater than the beam passes of a contiguous one of said ablation cuts such that said one ablation cut has a depth which is greater than said contiguous ablation cut and said micro-topography depth feature has a variable depth in a direction transverse to said beam paths.

10. The method according to claim 9, wherein said method further includes the steps of providing a mask in said laser through which said laser beam passes for said shaping of said laser beam, said mask having a mask aperture through which said laser beam passes.

11. The method according to claim 10, wherein said aperture has a geometric shape which defines said geometric shape of said laser beam.

12. The method according to claim 4, wherein said relative movement between said laser beam and said seal ring is provided by the steps of positioning said seal ring on a support unit and moving said support unit to displace said seal ring relative to said laser beam.

13. The method according to claim 12, wherein said seal ring is annular and said seal face extends circumferentially, said moving of said seal ring being accomplished by rotating said seal ring relative to said laser beam.

14. The method according to claim 4, wherein said leading and trailing edges are symmetric relative to each other.

15. The method according to claim 4, wherein said micro-topography depth features define a wavy face pattern on said seal ring such that said seal ring is adapted to operate in non-contacting relation with another seal ring in a mechanical seal.

16. A method of forming a seal ring configured for use in a mechanical seal, comprising the steps of:
providing a seal ring which has a flat seal face;
providing a laser having a laser beam which is adapted to remove seal ring material from said seal face;
providing a mask between said laser and said seal ring which includes an aperture adapted to shape said seal ring;
directing said laser beam through said aperture of said mask such that said laser beam has a geometric shape, said geometric shape having opposite side edge regions defined by non-linear side edges which taper outwardly from a center portion of said geometric shape such that an ablation cut of said laser beam on said seal face has a non-uniform depth across a width of said ablation cut; and
forming one or more micro-topography depth features in said seal face by applying said shaped laser beam to said seal face and providing a plurality of said ablation cuts to said seal face with said laser beam to create said one or more micro-topography depth features.

17. The method according to claim 16, wherein the step of forming said depth features comprises the step of moving said laser beam relative to said seal face along a beam path through one or more passes of said laser beam to define each said ablation cut.

18. The method according to claim 17, wherein said moving of said laser beam includes the steps of displacing said laser beam relative to said seal face to define a plurality of said beam paths which are disposed adjacent and contiguous to each other to define a plurality of contiguous ablation cuts.

19. The method according to claim 18, wherein side edge regions of contiguous ones of said ablation cuts are overlapped wherein said overlapped edge regions have a cut depth which is proximate the cut depth in the region of the non-overlapped center portions of said ablation cut.

20. The method according to claim 16, wherein the depth of said ablation cut in the area of said side edge portions of said laser beam is less than the depth in the area of the center portion of said laser beam.

21. The method according to claim 20, wherein said side edges are arcuate.

22. The method according to claim 16, wherein said moving of said laser beam relative to said seal ring comprises the step of displacing said seal ring relative to said laser beam which is disposed in a fixed position.

23. A method of forming a seal ring comprising the following steps:
providing a seal ring wherein said seal ring has a flat seal face;
providing a laser having a laser beam that is directed to said seal face;
shaping the laser beam so as to have a geometric shape with convergent non-linear side edges so that the cut of the laser beam has a non-uniform depth across the width thereof; and
providing a plurality of ablation cuts with said laser beam over at least a portion of the seal face to create one or more micro-topography depth features, each said ablation cut being formed by relative movement of said laser beam and said seal ring wherein said laser beam cuts through one or more passes along a beam path to form said ablation cut along said beam path, said laser beam being applied to a plurality of sidewardly adjacent beam paths such that the ablation cuts are located sidewardly contiguous to each other and the adjacent side edge regions of adjacent passes of the laser beam are overlapped and formation of excessive depth grooves is prevented, at least one of said ablation cuts being formed by multiple passes of said laser beam to have a depth greater than a contiguous one of said ablation cuts whereby said micro-topography depth feature has a variable depth in a direction transverse to the beam path.

24. A method of forming a seal ring comprising the following steps:
providing a seal ring wherein said seal ring has a flat seal face;
providing a laser having a laser beam that is directed to said seal face;
shaping the laser beam so as to have a geometric shape with convergent non-linear side edge sections so that the cut of the laser beam has a non-uniform depth across the width thereof wherein said side edge sections of said geometric shape are arcuate; and
providing a plurality of ablation cuts with said laser beam over at least a portion of the seal face to create one or more micro-topography depth features, each said ablation cut being formed by relative movement of said laser beam and said seal ring wherein said laser beam cuts through one or more passes along a beam path to form said ablation cut along said beam path, said laser beam being applied to a plurality of sidewardly adjacent beam paths such that the ablation cuts are located sidewardly contiguous to each other and the adjacent side edge regions of adjacent passes of the laser beam are overlapped and formation of excessive depth grooves is prevented.

* * * * *